United States Patent [19]
Tsurumi et al.

[11] Patent Number: 5,650,882
[45] Date of Patent: Jul. 22, 1997

[54] DISK UNIT PERFORMING CONTROL USING SECTOR PULSES

[75] Inventors: Hiroshi Tsurumi; Gen Ohshima; Masafumi Sato; Masataka Shitara, all of Kawasaki, Japan

[73] Assignee: Fujitsu Limited, Kawasaki, Japan

[21] Appl. No.: 342,815

[22] Filed: Nov. 21, 1994

[30] Foreign Application Priority Data

Feb. 2, 1994 [JP] Japan ................. 6-010868

[51] Int. Cl.$^6$ .................. G11B 5/09; G11B 5/596
[52] U.S. Cl. .................. 360/51; 360/78.14
[58] Field of Search ................ 360/48, 51, 49, 360/78.14

[56] References Cited

U.S. PATENT DOCUMENTS

| | | | |
|---|---|---|---|
| 4,016,013 | 4/1977 | Ottesen | 360/135 |
| 5,050,013 | 9/1991 | Holsinger | 360/72.1 |
| 5,068,755 | 11/1991 | Hamilton et al. | 360/72.1 |
| 5,274,509 | 12/1993 | Buch . | |

FOREIGN PATENT DOCUMENTS

| | | |
|---|---|---|
| 9015407 | 12/1990 | WIPO . |
| 9308561 | 4/1993 | WIPO . |

OTHER PUBLICATIONS

IBM Technical Disclosure Bulletin, entitled "High Speed Track Format Switching for Zoned Bit Recording," vol. 36, No. 11, pp. 669–673, dated Nov. 1993.

IBM Technical Disclosure Bulletin, entitled "Early Interrupt for Disk Controller," dated Feb. 1983.

*Primary Examiner*—W. C. Kim
*Attorney, Agent, or Firm*—Greer, Burns & Crain, Ltd.

[57] ABSTRACT

An object of the present invention is to minimize an overhead attributable to internal control and to provide a CDR type disk unit in which even when a head moves over a zone boundary, a sector pulse indicating a destination sector can be generated reliably without waiting for an index pulse. The disk unit includes a processing unit; a sector pulse generation unit which generates a sector pulse according to a signal written in the servo information on medium surface; and a format control unit which starts the formatting control when said sector pulse is received after a activating command is received from said processing unit; a target sector detection unit which detects the instant when said head reaches the target sector. The sector pulse generation unit stops outputting the sector pulses to the format control unit from when the access operation starts until a target pulse is received from the target sector detection unit.

25 Claims, 10 Drawing Sheets

| ZONE NUMBER | SECTOR LENGTH | MAXIMUM SECTOR NUMBER |
|---|---|---|
| 0 | S0 | M0 |
| 1 | S1 | M1 |
| 2 | S2 | M2 |
| ⋮ | ⋮ | ⋮ |
| 11 | S11 | M11 |

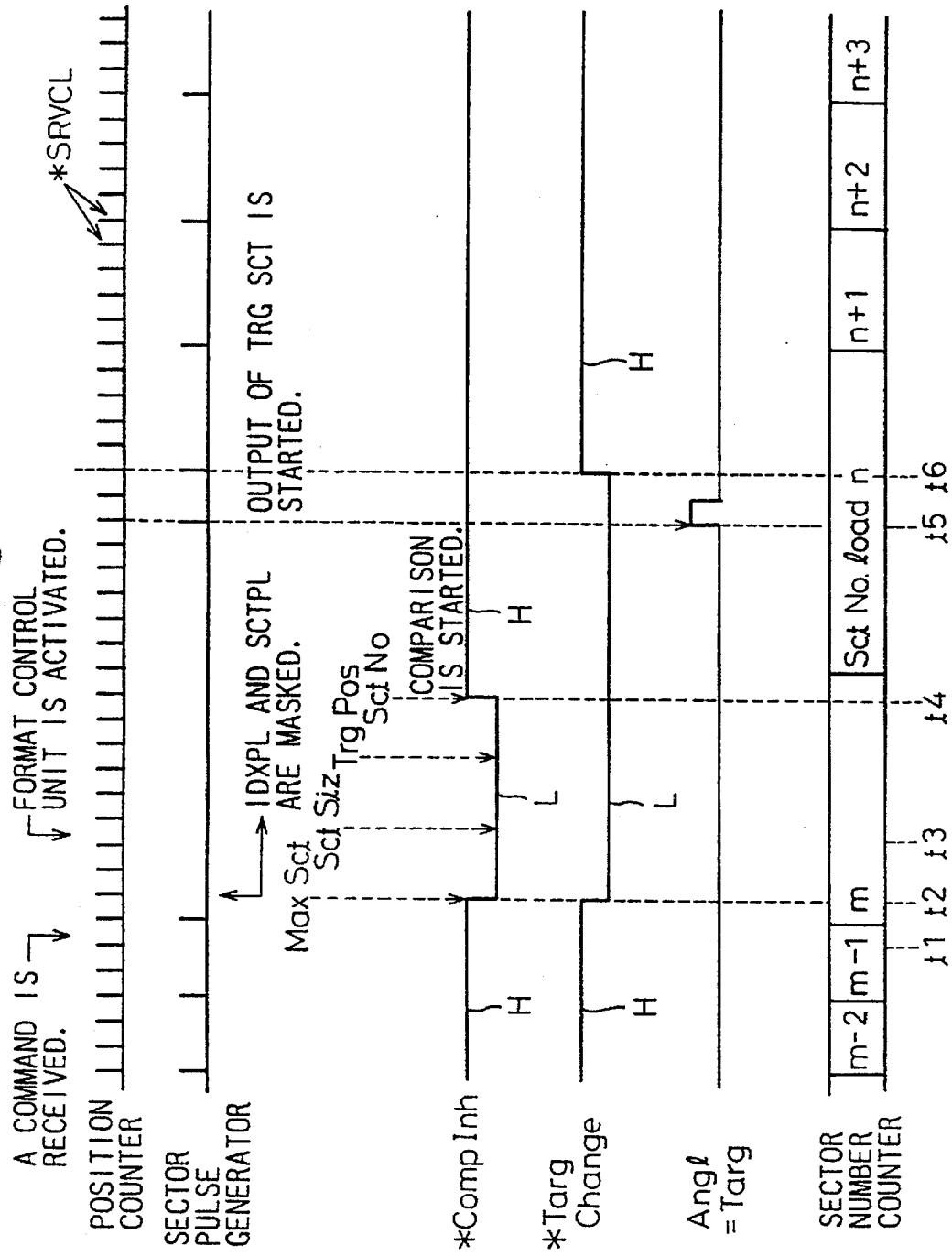

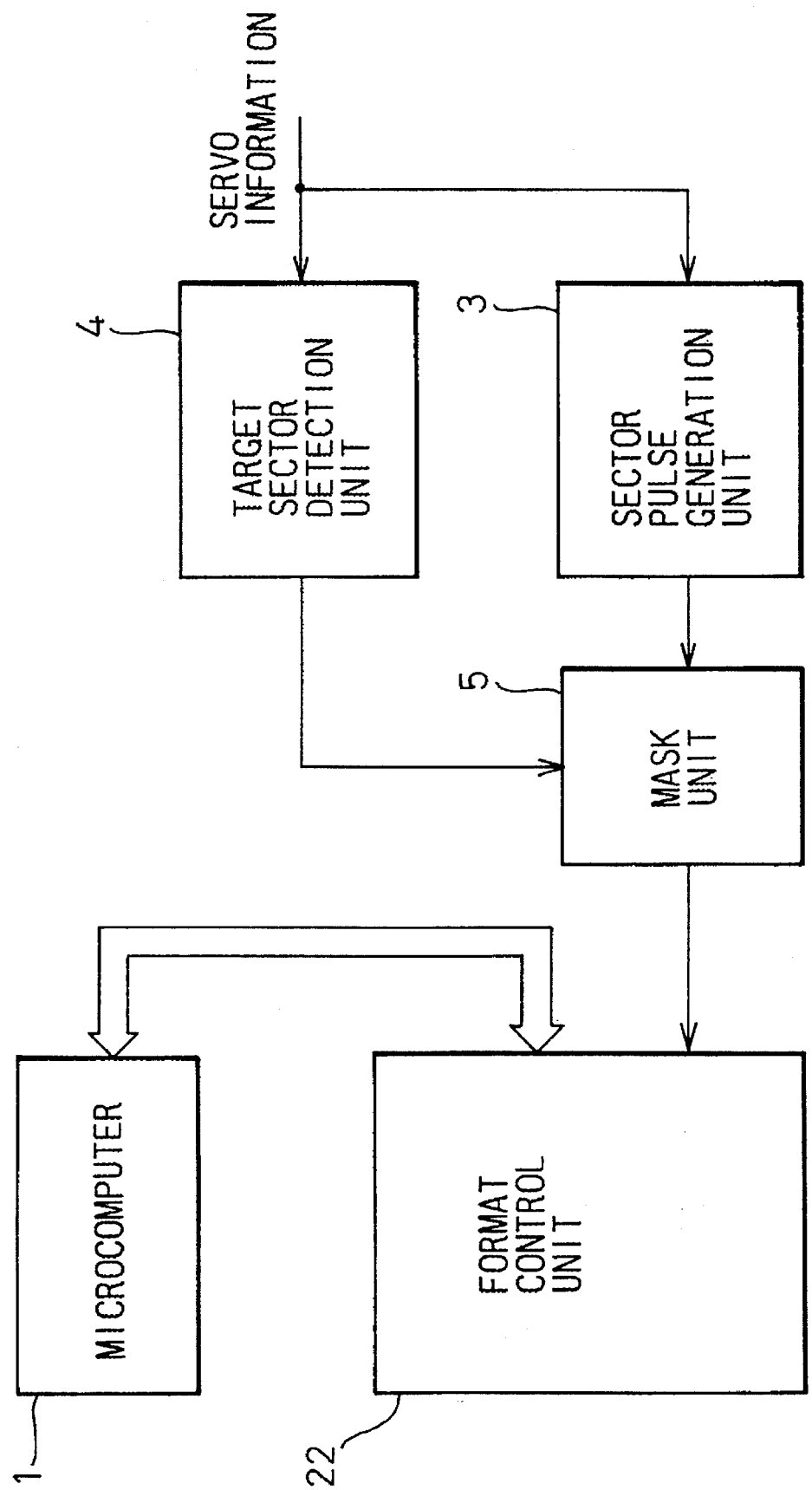

DISK UNIT PERFORMING CONTROL USING SECTOR PULSES

BACKGROUND OF THE INVENTION

1. Field of the Invention

The present invention relates to a magnetic disk unit and a sector control method for a magnetic disk unit.

2. Description of the Related Art

In recent years, marked progress has been made in a compact magnetic disk unit technologies. The performance and storage capacities of compact magnetic disk units have been considerably improved.

The major factors contributing to the improvement in the performance are reduced seek time, reduced rotation wait time due to the high-speed rotation of the disk, and an improved data transfer speed due to the increased recording density. These factors result from the improvements in fundamental magnetic disk unit technologies.

Accordingly, the overhead attributable to internal processing, which had usually been disregarded in the past, has become a critical problem. It is now required that the internal processing speed is reduced to the order of microseconds.

In recent years, disks having a diameter of 3.5" or less has become standard in an effort to cope with an increasing demand for a small-sized magnetic disk unit. When it comes to disks having the same diameter, the contradictory qualities of a large storage capacity and a small height are required.

A technique often employed for increasing a storage capacity per magnetic disk is to divide a magnetic disk into several concentric zones, and to write data using a different recording frequency in each zone.

The above technique is generally referred to as a constant density recording (CDR) technique or a zone density recording (ZDR) technique.

According to a conventional technique for writing data at a single recording frequency, the recording density along the outer track of a disk is lower than that along the inner track thereof. In contrast, according to the CDR or ZDR technique, the recording frequency along the outer track is made higher than that along an inner track. In this way, the recording densities along the outer track is substantially the same as that at the inner track, thus offering a large storage capacity.

In a conventional magnetic disk unit, index pulses and sector pulses are produced according to servo information previously written on a servo surface of a magnetic disk (which will be referred to as the medium). These pulses are used to control formatting. This technique is implemented in a known hard-sectored magnetic disk unit.

This kind of magnetic disk unit has a microcomputer responsible for internal control and a format control unit to control formatting.

At present, in a hard-sectored magnetic disk unit, when a head reaches a sector (sector n-1) immediately preceding a sector (sector n) at which reading, writing, or formatting is to start, a microcomputer issues a command to a format control unit so that the format control unit is activated synchronously with the leading edge of a sector pulse.

Some means is therefore needed to detect the sector immediately preceding the sector at which processing is to start, and to activate the format control unit within a time interval corresponding to the length of one sector after the sector is detected.

The simplest method of detecting a specific sector is to poll a sector counter using a microcomputer. However, when engaged in polling, the microcomputer cannot accept an interrupt. An interface in a host computer must wait until polling is completed, and ecessive overhead therefore arises. As a solution of this problem, a technique using hardware to detect a specific sector and output an interrupt signal has been widely adopted in the past.

A hardware-based method for detecting a specific sector and outputting an interrupt signal to a microcomputer will be described. A magnetic disk unit receives a command from a host computer to access a disk.

When the head is to start reading or writing at a sector n, the microcomputer instructs a specific sector detector to detect a sector n-1. Namely, the microcomputer activates the interrupt circuit.

Thereafter, in response to an interrupt signal generated, the microcomputer issues a command to a format control unit. Namely, the microcomputer activates the format control unit.

Consequently, when the head reaches the given sector n, the format control unit is activated. An operation to read or write data is then carried out.

That is to say, the time interval after an interrupt occurs to access a sector n-1 until a command is issued to a format control unit must not exceed the time interval corresponding to the length of a single sector. This interruption for sector access is therefore given top priority. Consequently, Another interrupt request cannot be accepted during the sector access operation.

As far as the above procedure is concerned, the time interval of sector access operation is seen as an overhead by an interface in a host computer.

In the CDR or ZDR technique, when a magnetic head moves over a zone, it takes considerable time to identify data in a sector header indicating a destination sector. An excessive wait time arises every time a head overpasses a zone, and a technology therefore been suggested such that when a head moves, on efficient and quick identification of a bit position of data in a sector header indicating a destination sector is possible.

As mentioned above, a compact magnetic disk unit generally adopts a fixed sector length technique. This technique makes it necessary to output a sector pulse serving as a delimiter between sectors to a hard disk controller (HDC). The sector pulse is output at certain intervals (at intervals of a sector length) along a track of a medium with an index mark formed on the medium as an origin.

In general, a servo clock is a clock whose pulses are counted in order to define a sector length and which attains synchronism with a rotational variation of a disk. When a single recording frequency is used to write data, a count of servo clock pulses corresponding to a sector length is constant between tracks on a disk. Therefore, when a disk is activated, the sector length is merely be set in a load register for a counter.

Thereafter, the sector length is re-loaded in response to every index mark or sector. Counting is then performed. A sector pulse is produced in response to a Carry Out signal provided by a counter.

When the aforesaid CDR technique is employed, the number of servo clock pulses corresponding to a sector length differs from zone to zone. When a magnetic head moves to a new zone, a bit position of data in a sector header indicating a destination sector cannot be identified until the counter is reset to zeros in response to an index mark. Therefore, every time the head moves to a new zone, an index wait time is needed.

SUMMARY OF THE INVENTION

The present invention attempts to solve the foregoing problems in the prior arts. An object of the present invention is to minimize the overhead due to a wait time during an access operation utilizing general LSI products which constitutes a magnetic disk control circuit as they are, without any modification.

Another object of the present invention is to reliably generate a sector pulse indicating a destination zone without causing an index wait time even if a magnetic head in a CDR type magnetic disk unit moves to a new zone.

In a hard-sectored magnetic disk unit, LSI products constituting a control circuit are arranged in such a manner that a processing unit issues a command to activate a format control unit, and a given operation is started synchronously with the first sector pulse or index pulse.

Using suitable means, a sector pulse to be input to the format control unit is masked until the magnetic head reaches a given sector. Thereby, the processing unit can issue a command to the format control unit at any time instant. Moreover, operations including reading and writing can be started at a target sector without intervention of the processing unit.

Accordingly, a hard-sectored magnetic disk unit (normal disk unit that is not a CDR type disk unit) or a CDR type hard-sectored magnetic disk unit is provided with a processing unit which controls access of at least a head to a target sector; a sector pulse generation unit which generates a sector pulse according to a signal written in the servo information on medium surface; a format control unit which controls formatting of read data and write data, and which starts the formatting control when the sector pulse is received after an activating command is received from the processing unit; and a target sector detection unit which receives information regarding the target sector from the processing unit, detects the time instant when the head reaches the target sector according to the information specified by the processing unit and information generated from the signal written in servo information on medium surface, and outputs a target pulse at the time instant. The sector pulse generation unit stops outputting the sector pulses to the format control unit from when the access operation starts until the target pulse is received from the target sector detection unit.

For starting reading or writing, the processing unit outputs a control signal so that the sector pulse generation unit stops outputtig sector pulses to the format control unit. Next, the processing unit issues a command to the format control unit to activate the format control unit. Thereafter, the sector pulse generation unit outputs a sector pulse to the format control unit when the head reaches a target sector. Namely, a sector pulse is generated at the start of the target sector, and then sent to the format control unit. The format control unit then automatically starts reading or performing any other operation.

According to the foregoing sequence, a sector pulse indicating a destination sector can be generated reliably without waiting for an index pulse. A sector pulse generated in response to the start of the target sector is fed to the format control unit. Any operation can therefore be started reliably at the target sector.

After being activated by the processing unit, the format control unit automatically executes reading or writing in response to a sector pulse. After activating the format control unit, the processing unit can therefore start another process. Consequently, no overhead is caused by the processing unit.

In order to discover the destination sector position, a counting means is designed to count servo clock pulses for the period during which the medium rotates once with an index mark as an origin. A counting means which counts consecutive sectors succeeding a target sector after loading a target sector number specified by the processing unit is also included so that when the head accesses the target sector, the number of the sector over which the head is currently passing can be identified.

For checking a destination sector position or accessing a target sector, the number of the sector over which the head is currently passing can be confirmed. Control can therefore be passed efficiently.

BRIEF DESCRIPTION OF THE DRAWINGS

The present invention will be more clearly understood from the description as set forth below with reference to the accompanying drawings, wherein:

FIG. 11 is a time chart concerning a sector pulse control unit in the embodiment;

FIG. 12 is a block diagram showing a fundamental constitution of a magnetic disk unit according to a second aspect of the present invention.

DESCRIPTION OF THE PREFERRED EMBODIMENTS

Before proceeding to a detailed description of the preferred embodiments of the present invention, a conventional disk unit will be described below for a clearer understanding of the differences between the present invention and the prior art.

Figure 1:
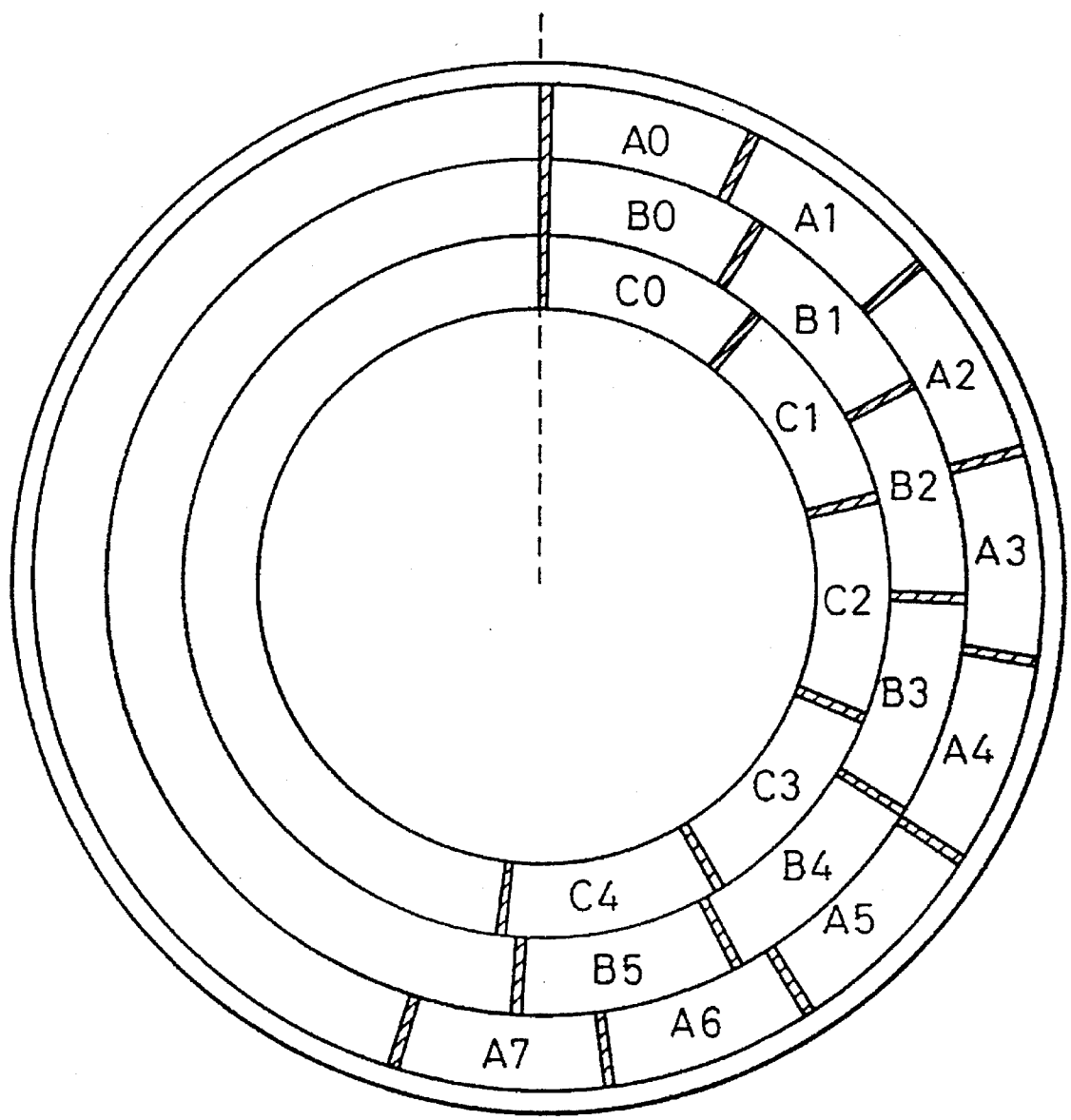
FIG. 1 is an explanatory diagram concerning a CDR technique.

FIG. 1 is an explanatory diagram concerning the constant density recording (CDR) technique.

In a hard-sectored magnetic disk unit, one track on a data disk is divided into a plurality of sectors. Data is written or read in units of a sector. When a disk unit includes a plurality of data disks, a group of tracks on respective disks, which tracks have same radius, is called a cylinder. In the following, this term is used.

While a disk is rotating, the speed in the circumferential direction differs from cylinder to cylinder. Namely, the speed of the head relative to the surface of the disk is low along the inner cylinder of the disk and becomes higher toward the outer cylinder thereof. Therefore, if the recording is performed at a constant frequency, the recording bit density along the outer cylinder of a disk is therefore lower than that along the inner cylinder thereof. This means that one bit length on the outer cylinder is larger than that on the inner cylinder.

It is requested to increase a storage capacity of a disk unit without increasing the size thereof. This request can be realized by increasing a storage capacity per magnetic disk. A constant density recording (CDR) technique or a zone density recording (ZDR) technique is usually employed for increasing the storage capacity of a magnetic disk.

As shown in FIG. 1, for example, a disk is divided in a radial direction into a plurality of zones; A, B, C, and so forth, and recording is carried out by varing the recording frequencies from zone to zone. As described above, cylinders are divided into a plurality of sectors. Therefore, the number of sectors per zone varies. In this way, the recording densities in the zones are kept high. This technique is called a CDR technique.

Assume that the outermost zone is zone A, the second outermost zone is zone B, the third outermost zone is C, and so forth. The number of sectors per zone, SN, is set to N1 for zone A, N2 for zone B, and N3 for zone C. The values for N1, N2, N3 are determined to have a relationship of N1>N2>N3.

Namely, the number of sectors per zone becomes larger from the inner cylinder of a disk toward the outer cylinder thereof. This results in uniform recording bit densities, namely, uniform bit lengths. Eventually, the recording capacity of the whole disk increase.

Figure 2:
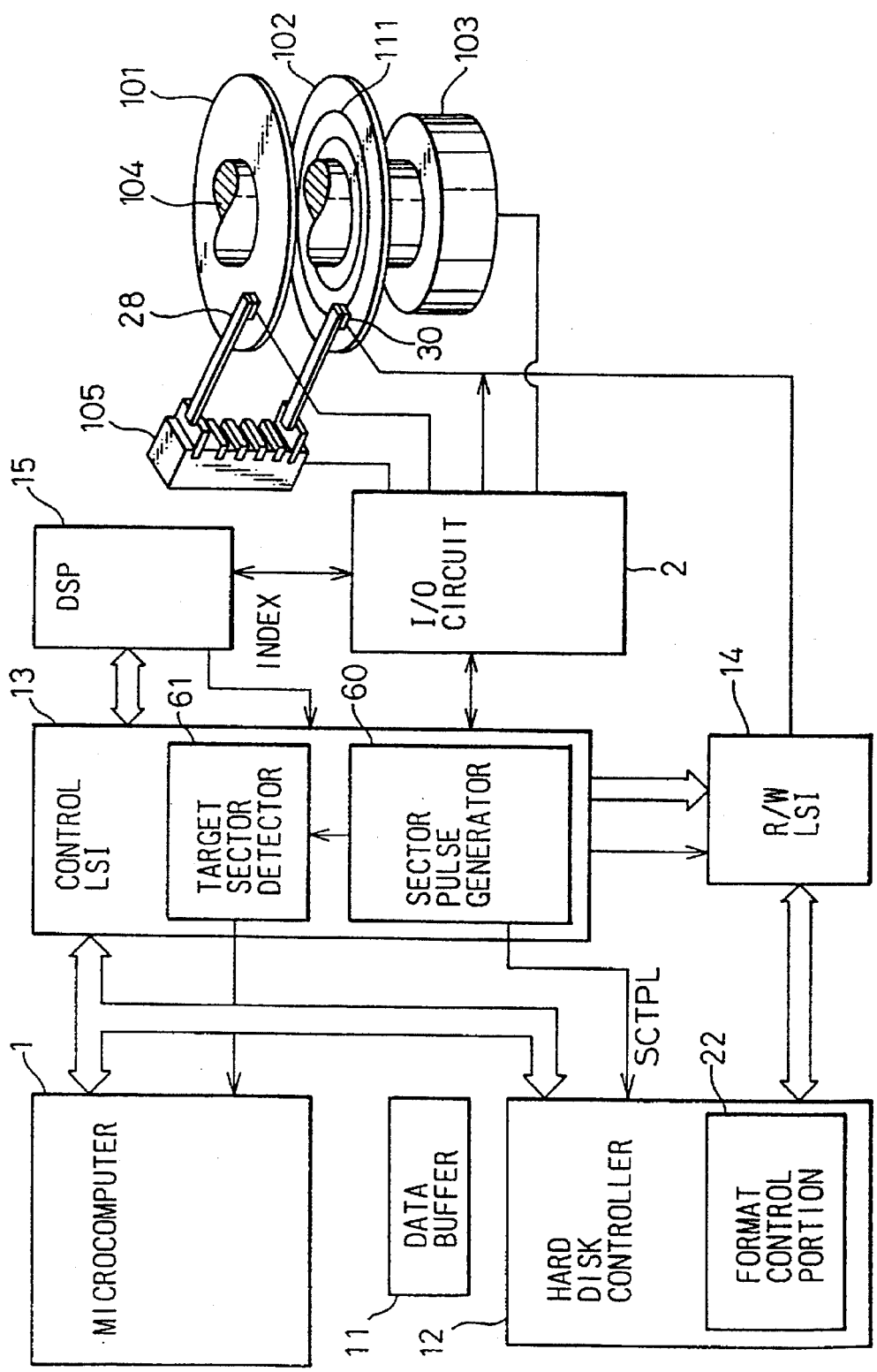
FIG. 2 is a block diagram showing a fundamental constitution of a conventional magnetic disk unit.

FIG. 2 is a block diagram showing a fundamental constitution of a conventional disk unit.

In FIG. 2, reference numeral 1 denotes a microcomputer; 2 denotes an input/output (I/O) circuit; 11 denotes a data buffer; 12 denotes a hard disk controller which includes a format control unit 22; 13 denotes a control LSI which includes a sector pulse generator 60; 14 denotes a read/write LSI; 15 denotes a digital signal processor (DSP); 101 denotes a servo disk 101; a plurality of data disks 102 (Only one is shown in the figure.); a DC motor (spindle motor) 103; an electromechanical actuator 105; a servo head 28; and a read/write head 30.

The servo disk 101 and the data disks including the disk 102 are mounted to the rotating axis 104, therefore, every disks rotates together. Servo information is recorded on a surface of the servo disk, and the servo information is read by the servo head. The read information is demodulated into various servo information such as a servo clock SRVCL by the I/O circuit 2. Data is read or written from or to surfaces of the data disks through the read/write head 30. The electromechanical actuator 105 moves the servo head 28 and the read/write head 30 to selected tracks. The I/O circuit 2 performs operations to convert signals transferred between the above-mentioned elements and a control portion.

As described above, in a conventional magnetic disk unit, an index pulse and a sector pulse are produced according to servo information written on a servo surface of a magnetic disk. These pulses are used to control reading and writing of data.

The microcomputer 1 controls various circuit elements in the magnetic disk unit using the servo information. The hard disk controller (HDC) 12 performs various interface control operations between a host computer, transfers commands, analyzes commands, and controls data transfer. The data buffer 11 is a memory accessed by the HDC 12 when, for example, data is transferred from a host computer or data is read from a medium. The control LSI device 13 controls communications in the disk unit. The sector pulse generator 60 of the control LSI device 13 generates a sector pulse SCTPL according to the servo information. The microcomputer 1, the hard disk controller 12 and the control LSI 13 are connected through a data bus. The read/write LSI device 14 demodulates or modulates read data or write data, and performs various data processes. The read/write LSI device is connected to the HDC 12 via a read/write data bus. The digital signal processor (DSP) performs servo control in response to an instruction sent from the microprocomputer 1. The DSP 15 produces an index signal INDEX according to servo information written on a servo information surface of the servo disk 101, and sends the index signal INDEX to the sector pulse generator 60 in the control LSI device 13.

The HDC 12 includes a format control unit 22 which controls formatting of read data or write data from or into the data disk. The format control unit 22 starts this operation when it receives a sector pulse SCTPL from the sector pulse control unit 23 after it receives a command indicating this operation from the microcomputer 1.

At present, in a hard-sectored magnetic disk unit, when a head reaches the sector (sector n-1) immediately preceding the sector (a sector n) at which reading or writing is to occur, a microcomputer 1 issues a command to the format control unit 22 so that the format control unit 22 is activated synchronously with a given leading sector pulse.

The control LSI 13 includes a target sector detector 61 which detects the sector immediately preceding the sector at which processing is to start and outputs a target sector detection signal to the microcomputer 1.

Figure 3:
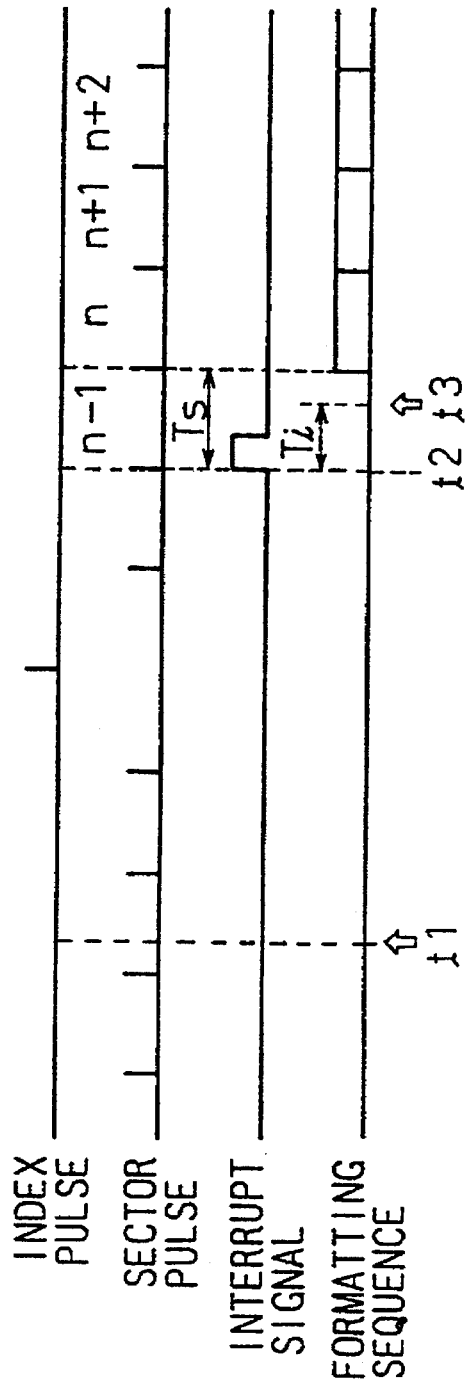
FIG. 3 is a time chart showing an access operation to a target sector in the conventional magnetic disk unit.

FIG. 3 is a time chart relating to this operation. In FIG. 3, t1, t2, and t3 denotes time instants. Ts denotes the time interval required for translation between sectors. Ti denotes the time interval between the time instants t2 and t3.

Assuming that a command is issued to start reading or writing at a sector n. The microcomputer 1 instructs the target sector detector 61 to detect sector n-1 and activates an interrupt circuit at the time instant T1. When the target sector detector 61 detects that the head has reached the sector n-1, an interrupt signal is generated. This time instant is t2. In response to the interrupt signal, the microcomputer 1 issues a command to a format control unit at a time instant t3.

Consequently, when the head reaches the given sector n, the format control unit 22 is activated. Processing is then carried out, whereby data is read or written from or into the disk.

Therefore, there occurs a problem that the time interval Ti, from after an interrupt occurs upon detection of sector n-1 until a command is issued to the format control unit 22, must not exceed the time interval Ts corresponding to the length of a single sector. A sector interrupt is therefore given top priority. Another interrupt request must be ignored while sector interruption is active. The time interval Ti is seen as an overhead by an interface in a host computer.

Superb magnetic disk control circuits have recently been commercialized as LSI products. Using of special hardware in addition to such general products is disadvantageous cost-wise.

Further, when the aforesaid CDR technique is employed, the number of servo clock pulses corresponding to a sector length differs from zone to zone. When a magnetic head moves over a zone, the position of data in a sector header indicating a destination sector cannot be identified until the counter is reset to zero in response to an index mark. Therefore, every time the head passes over a zone, an index wait time is needed.

Figure 4:
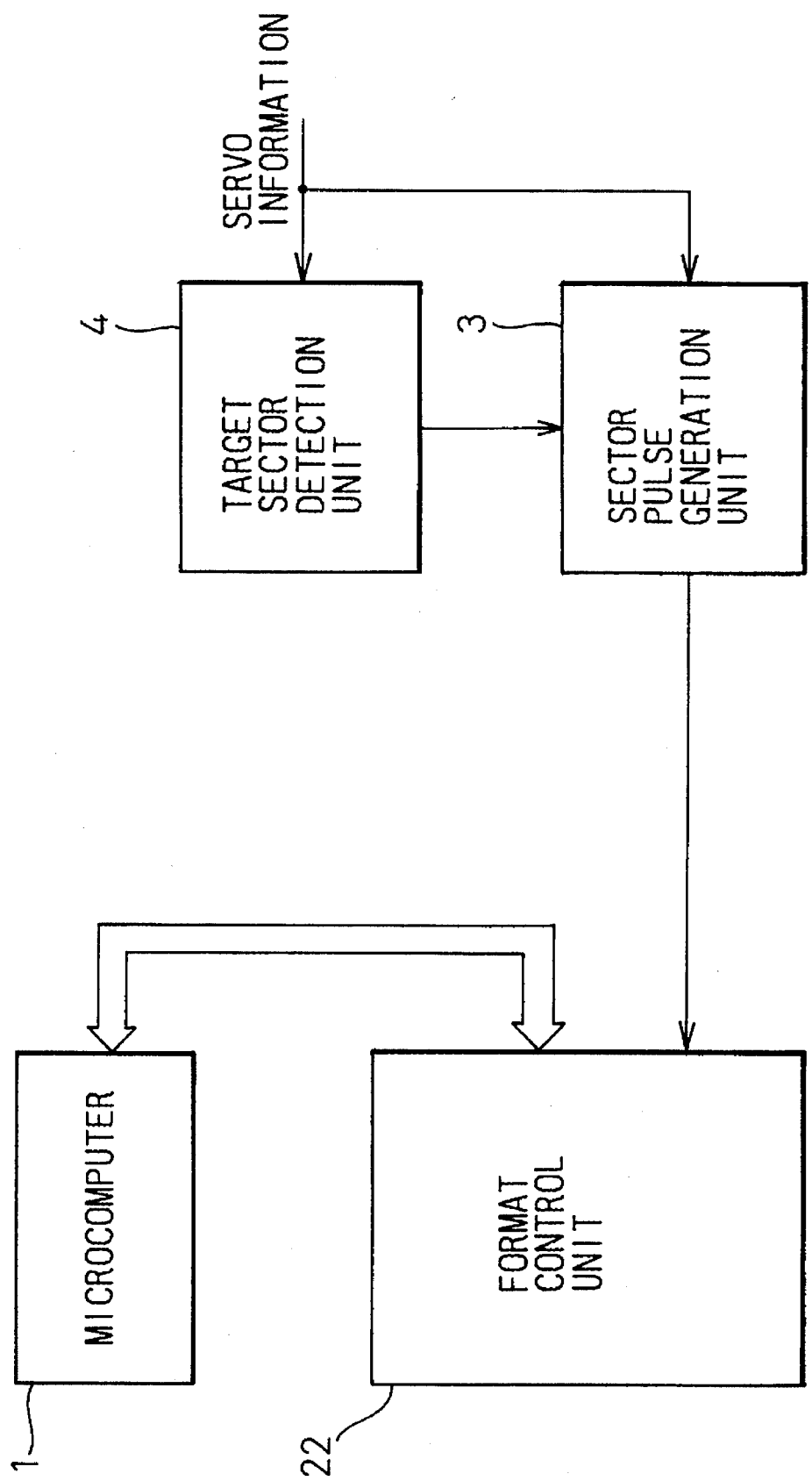
FIG. 4 is a block diagram showing a fundamental constitution of a magnetic disk unit according to the present invention.

FIG. 4 is a block diagram showing a fundamental constitution of a control unit of a magnetic disk unit according to the present invention.

In FIG. 4, reference numeral 1 denotes a processing unit which controls access of at least a head to a target sector; 3 denotes a sector pulse generation unit which generates a sector pulse (SCTPL) according to a signal written in servo information on a medium surface; 22 denotes a format control unit which controls the formatting of read data and write data, and which starts the formatting control when the sector pulse is received after a activating command is received from the microcomputer 1; and 4 denotes a target sector detection unit which receives information regarding the target sector from the microcomputer 1, detects a time instant when the head reaches the target sector according to the information specified by the microcomputer 1 and information generated from the signal written in servo information on medium surface, and outputs a target pulse at the correct time instant. The sector pulse generation unit 3 stops outputting the sector pulse (SCTPL) to the format control unit 22 from when the access operation starts until the target pulse is received from the target sector detection unit 4. In practice, the processing unit is realized as a microcomputer.

An embodiment of the present invention will be described in conjunction with FIGS. 5 to 11. The embodiment described below is an example of a CDR type magnetic disk unit.

FIGS. 5 to 11 show an embodiment of the present invention. In FIGS. 5 to 11, elements having functions the same as those in FIG. 2 are denoted by same reference numerals. Reference numeral 6 denotes an interface (I/F); 7 denotes a drive control unit; 8 denotes a microprocessor (MPU); 9 denotes a programmable ROM (PROM); 10 denotes a dynamic RAM (DRAM); 11 denotes a data buffer; 12 denotes a hard disk controller (HDC); 13 denotes a control LSI device; 14 denotes a read/write LSI device; 15 denotes a digital signal processor (DSP); 16 denotes a VCM control circuit; 17 denotes a control circuit; 18 denotes a demodulator; 19 denotes a decoder (DEC); 22 denotes a format control unit; 23 denotes a sector pulse control unit; 26 denotes a voice coil motor (VCM); 27 denotes a DC motor; 28 denotes servo head (SRV HEAD); 29 denotes a head IC (HD IC); 30 denotes a read/write head; 33 denotes a position counter; 34 and 35 denote comparators; 36 denotes a sector length counter; 37 denotes a sector number counter; 38 denotes a target register (TARG REG); 39 denotes a size register (SIZE REG); 40 denotes a maximum register (MAX REG); 41 denotes a sector number register (SCTN REG); 43 denotes a Target Change signal generator; 45 denotes a register; 46 denotes a sector pulse generator; 47 and 48 denote OR circuits; 49, 50, 51, and 56 denote AND circuits; 52 denotes an inverter; 53 denotes an index pulse generator; 57, 58, and 59 denote JK flip-flops (JK-FF).

Signals sent from the circuit elements shown in FIGS. 5 to 11 will be described below. Note that a signal bearing an asterisk * is active low.

* RDGT denotes a Read Gate signal; *WTGT denotes a Write Gate signal; INDEX denotes an index signal; SCTPL denotes a sector pulse; IDXPL denotes an index pulse; RDCLK denotes a Read clock; WTCLK denotes a Write clock; SRVCL or *SRVCL denotes a servo clock; DRV Error means a Drive Error signal; *Index Load means an Index Load signal; Angl means an angle signal; Targ means a target signal. SCT No; means a sector number signal; * Targ Change means a Target Change signal; Sct No En means a Sector Number Enable signal; Max. Sct means a maximum sector signal; *Comp Inh means a Comparison Inhibit signal; Angl=Targ means a Target Sector Consistency signal; CO denotes a Carry Out signal; Sct No. Set means a Sector Number Set signal; Max. Sct Set means a Maximum Sector Set signal. In the description below, the respective signals are described using the above symbols.

The constitution of a magnetic disk unit of the embodiment is described with reference to FIG. 5.

Figure 5:
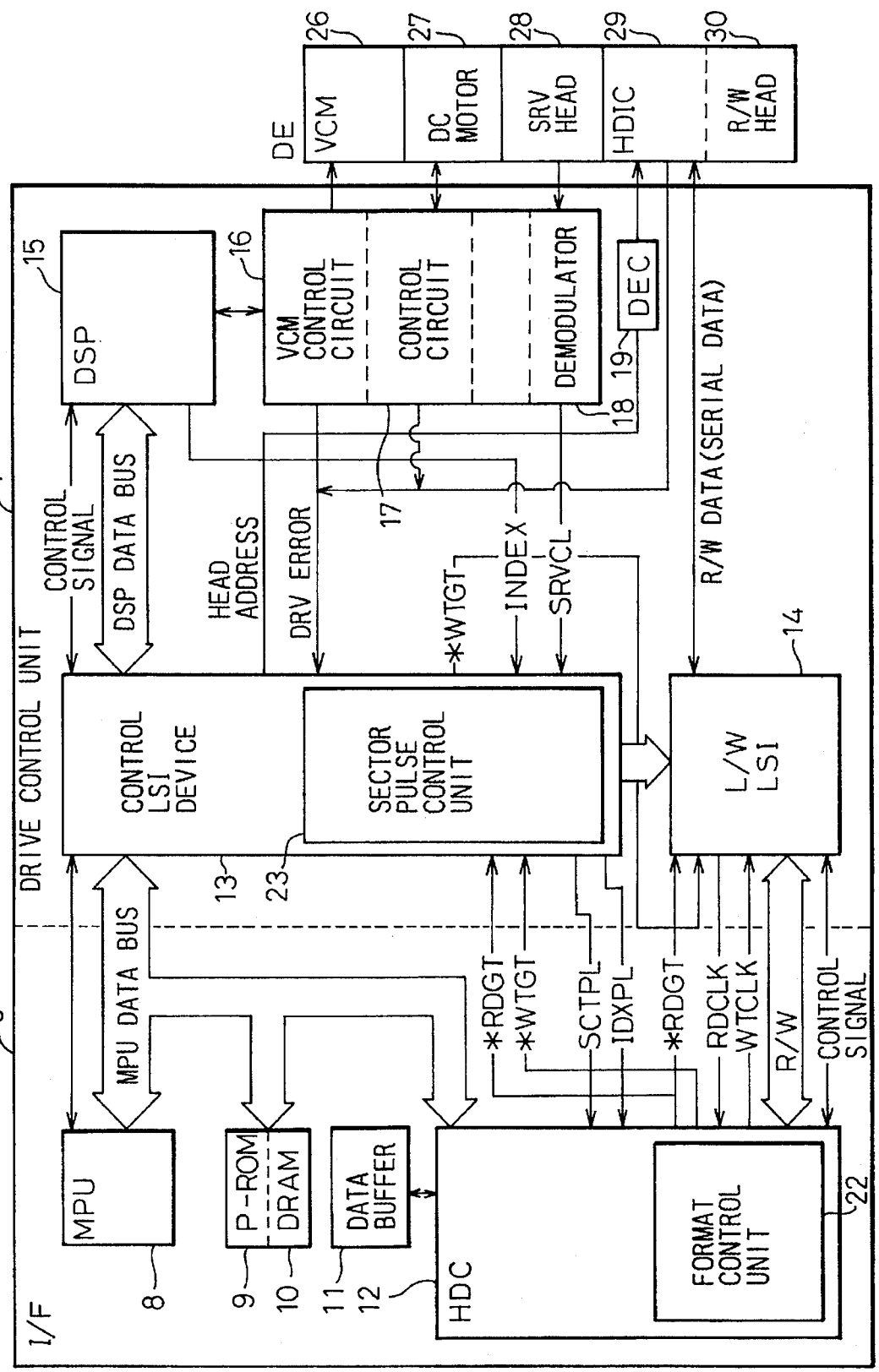
FIG. 5 is a block diagram showing a magnetic disk unit of an embodiment.

FIG. 5 is a block diagram showing a magnetic disk unit. As shown in FIG. 5, a magnetic disk unit comprises an interface (I/F) 6, a drive control unit 7, and a drive disk enclosure (DE).

The interface 6 includes a microprocessor 8, a programmable ROM 9, a DRAM 10, a data buffer 11, and a hard disk controller (HDC) 12. The drive control unit 7 includes a control LSI device 13, a read/write LSI device 14, a DSP 15, a VCM control circuit 16, a control circuit 17, a demodulator 18, and a decoder (DEC) 19. The microcomputer shown in FIG. 4 is realized by a combination of the microprocessor (MPU) 8, the programmable ROM (PROM) 9 and the dynamic RAM (DRAM) 10.

The HDC 12 contains a format control unit 22. The control LSI device 13 has a sector pulse control unit 23. The disk enclosure (DE) has a VCM 26, a DC motor 27, a servo (SRV) head 28, a head (HD) IC 29, a read/write (R/W) head 30. The above circuit elements will be described below.

The microprocessor 8 controls various circuit elements in the magnetic disk unit. The PROM 9 is a nonvolatile memory to which the microprocessor 8 gains access. Programs and various control information are stored in the PROM 9. The DRAM 10 is a memory to which the microprocessor 8 gains access and which is used as a work area by the microprocessor 8. For example, when the power supply of the disk unit is turned on, the microprocessor 8 reads control information from a control area in a medium and stores it in the DRAM 10. When accessing the medium in response to an instruction sent from a host computer, the microprocessor 8 control various circuit elements with reference to the control information.

The information to be stored in the DRAM 10 includes information concerning zones in a medium, a sector length of each zone, and a data table listing maximum sector numbers (the data table is produced by the microprocessor).

The data buffer 11 is a memory to which the HDC 12 hass access. For example, data transferred from a host computer or data read from a medium is stored in the data buffer 11.

The HDC 12 controls various interfaces attained relative to a host computer, transfers commands, analyzes commands, and controls data transfer. The DHC 12 contains the format control unit 22 which controls the formatting of read data or write data.

The control LSI device 13 controls communications in the disk unit or allows the sector pulse control unit 23 residing therein to control a sector pulse.

The read/write LSI device 14 demodulates or modulates read data or write data, and performs various data processing operations.

The DSP 15 performs servo control in response to an instruction sent from the microprocessor 8. The DSP 15 produces an index signal INDEX according to servo information written on the servo information surface of a medium, and sends the index signal INDEX to the sector pulse control unit 23 in the control LSI device 13.

The VCM control circuit 16 controls the voice control motor (VCM) 26 when the head is positioned at a target sector.

The control circuit 17 controls the DC motor (spindle motor).

The demodulator 18 demodulates servo information (for example, a servo clock SRVCL) read from the servo information surface of a medium using the servo head 28.

The demodulated servo clock SRVCL of the servo information is sent from the demodulator 18 to the sector pulse control unit 23 in the control LSI device 13. The servo clock SRVCL is a signal having a constant frequency irrelevant of a position in a medium.

The decoder 19 decodes a head address sent from the control LSI device 13 and sends it to the head IC 29.

The format control unit 22 receives an index pulse IDXPL and a sector pulse SCTPL from the sector pulse control unit 23, and controls the formatting of read data or write data.

After being activated by the microprocessor 8, for example, the format control unit 22 receives a sector pulse SCTPL from the sector pulse control unit 23, and starts controlling the formatting so as to read or write data from or into the medium.

The sector pulse control unit 23 controls a sector pulse (which will be described in detail later).

The VCM 26 positions a magnetic head at a target cylinder. The DC motor 27 rotates a medium (magnetic disk). The servo head 28 reads servo information recorded in the servo information surface of a medium. The head IC 29 writes or reads data into or from the read/write head 30. The read/write head 30 reads or writes data from or into a medium.

Next, signals sent from the circuit elements in the magnetic disk unit are described.

The Read Gate signal *RDGT carries a Read instruction from the HDC 12 to the control LSI device 13 and read/write LSI device 14.

The Write Gate signal *WTGT carries a Write instruction from the HDC 12 to the read/write LSI device 14. The signal is sent from the HDC 12 to the control LSI device 13, and then from the control LSI device 13 to the read/write LSI device 14.

The index signal INDEX is a signal, provided by the DSP 15, produced according to information read from servo information written in the servo surface of a medium demodulated by the demodulator 18. The INDEX signal is sent from the DSP 15 to the sector pulse control unit 23 in the control LSI device 13.

The sector pulse SCTPL indicates each sector position in a medium. The sector pulse SCTPL is generated by the sector pulse control unit 23 in the control LSI device 13 and sent to the format control unit 22 in the HDC 12.

The index pulse IDXPL is a signal based on the index signal INDEX and generated by the sector pulse control unit 23 in the LSI device 13. The IDXPL pulse is sent to the format control unit 22 in the HDC 12.

The read clock RDCLK is a clock for use in reading data from a medium.

The write clock WTCLK is a clock for use in writting data to a medium.

The servo clock SRVCL is a signal produced by demodulating servo information recorded in the servo surface of a medium. The signal is produced by demodulating a signal read using the servo head 28 by means of the demodulator 18. The SRVCL signal is sent from the demodulator 18 to the sector pulse control unit 23 in the control LSI device 13. The frequency of the servo clock SRVCL is the same at any position on a medium.

The Drive Error signal DRV Error is sent from the VCM control circuit 16, control circuit 17, or head IC 29 to the sector pulse control unit 23 in the control LSI device 13.

The actions taken in the magnetic disk unit are described briefly below. When a host computer issues a command, the HDC 12 receives the command, analyzes the contents of the command, and sends the contents to the microprocessor 8. Thereafter, the microprocessor 8 controls execution of the command.

The microprocessor 8 receives a Data Read or Write instruction specified in the command, computes a cylinder number in a medium to be accessed, a head number used for the access, and a sector number in the medium to be accessed, and issues a Head Seek instruction to the DSP 15 via the control LSI device 13. The DSP 15 sends a control signal to the VCM control circuit 16 and the VCM moves the heads.

At this time, the microprocessor 8 sets data concerning a target sector (which will be described later) in the sector pulse control unit 23 in the control LSI device. In the specified data, the sector pulse control unit 23 masks a sector pulse and an index pulse.

Thereafter, the microprocessor 8 issues an instruction to the format control unit 22 so as to activate the format control unit 22. Thereafter, the format control unit 22 reads or writes data in response to a command.

When activated by the microprocessor 8, the format control unit 22 waits for a sector pulse SCTPL produced by the sector pulse control unit 23. When receiving the sector pulse SCTPL, the format control unit 23 confirms that a head has been positioned over a current target sector.

The format control unit 22 controls the formatting, issues an instruction to the read/write LSI device 14, and starts reading or writing data from or into a medium.

In this case, first, synchronism is attained using a synchronising byte in a header in a medium. ID information is then read from an ID field in the header in the medium. It is then determined whether a cylinder number, a head number, and a sector number, which are written as the ID information, are consistent with those indicating a target sector.

If the ID information is inconsistent, the format control unit 22 performs nothing but waits for the next sector pulse. If the ID information is consistent, the format control unit 22 reads or writes date from or into the data field of the sector concerned. For format writing, the ID information or the like is written in the header as mentioned above.

Next, a constitution of the sector pulse control unit 23 is described.

Figure 6:
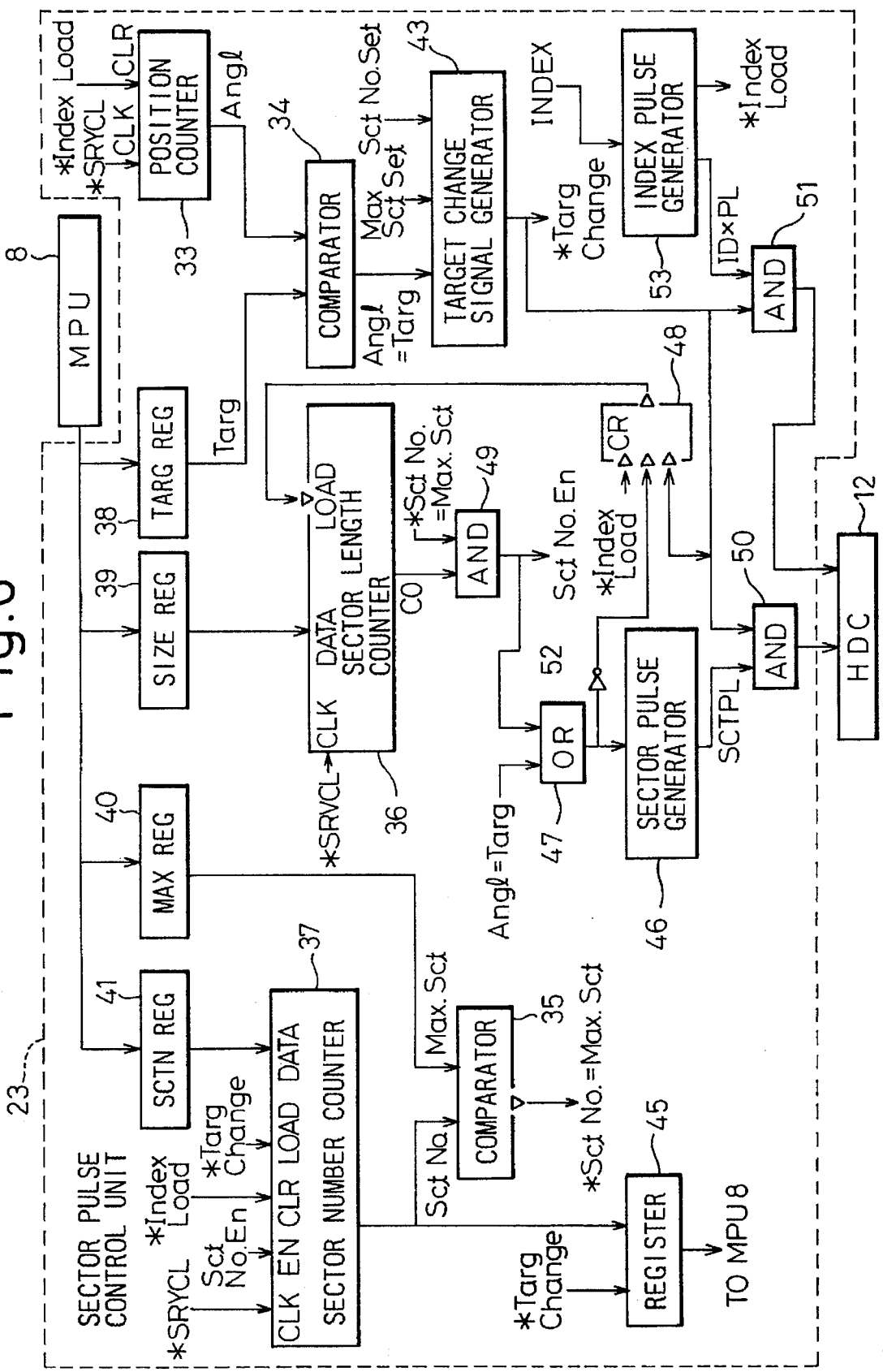
FIG. 6 is a block diagram showing a sector pulse control unit in the embodiment.

FIG. 6 is a block diagram showing a sector pulse control unit. As illustrated, the sector pulse control unit 23 incorporated in the magnetic disk unit comprises a position counter 33, comparators 34 and 35, a sector length counter 36, a sector number counter 37, a target register 38, a size register 39, a maximum register 40, a sector number register 41, a Target Change signal generator 43, a register 45, a sector pulse generator 46, OR circuits 47 and 48, AND circuits 49, 50, and 51, an inverter 52, and an index pulse generator 53.

The target sector detection unit 4 shown in FIG. 4 is realized by a combination of the position counter 33, comparators 34, target register 38 and the Target Change signal generator 43. The sector pulse generation unit 3 shown in FIG. 4 is realized by a combination of the sector length counter 36, the size register 39, the sector pulse generator 46, the OR circuit 48 and the AND circuit 49.

Signals sent from the above circuit elements will be described below. A signal bearing an asterisk * is active low. A triangle (See the OR circuit 48, comparator 35, and sector length counter) indicates an inverter.

An Index Load signal *Index Load is output when the index pulse generator 53 inputs an index signal INDEX and generates an index pulse IDXPL. The Index Load signal *Index Load is sent to the sector number counter 37, position counter 33, and OR circuit 48.

An angle signal Angl represents a count provided by the position counter 33; that is, a count indicating the number of servo clock pulse *SRVCL corresponding to a rotation angle of a medium.

A target signal *Targ is an output signal from the target register 38, representing a value that is set in the target register 38 by the microprocessor 8.

A sector number signal Sect No. is an output signal of the sector number counter 37 (representing a count).

A Target Change signal *Targ Change is output by the Target Change signal generator 43. This signal is sent to the sector number counter 37, AND circuits 50 and 51, and register 45.

A Sector Number Enable signal Sect No En is output by the AND circuit 49. This signal is sent to the sector number counter 37.

A Maximum Sector signal Max. Sct represents a value (maximum sector length) set in the maximum register 40. This signal is sent from the maximum register 40 to the comparator 35. The Maximum Sector Set signal Max Sct Set is output when a value is set in the maximum register 40. The Maximum Sector Set signal Max Sct Set is sent to the Target Change signal generator 43.

A Target Sector Consistency signal Angl=Targ is output by the comparator 34. This signal is provided when the target signal Targ provided by the target register 38 is consistent with the angle signal Angl provided by the position counter 33.

A Carry Out signal CO is output when the sector length counter 36 counts over a pre-determined value.

A Sector Number Set signal Sct No Set is output when a value is set in the sector number register 41. The Sector Number Set signal Sct No Set is sent to the Target Change signal generator 43.

Functions of circuit elements of the sector pulse control circuit are described below.

The position counter 33 keeps counting servo clock pulses *SRVCL for a time interval during which a disk rotated once with an index mark as an origin.

The position counter 33 inputs a servo clock *SRVCL (whose polarity is opposite to that of the servo clock SRVCL sent from the demodulator 18 in FIG. 4) through a clock terminal CLK thereof. The position counter 33 inputs an Index Load signal *Index Load through a clear terminal CLR thereof.

After being cleared (reset) with the *Index Load clock, the position counter 33 counts the *SRVCL clock pulses until it is cleared with the next *Index Load clock, and thus keeps outputting the count as an angle signal Angl.

The target register (TARG REG) 38 is a register in which the microprocessor 8 sets a target sector position. The value in the target register 38 is output to the comparator 34.

The size register (SIZE REG) 39 is a register in which the microprocessor sets a sector length (sector size). The value in the size register 39 is sent to the sector length counter 36.

The maximum register (MAX REG) 40 is a register in which the microprocessor 8 sets a maximum sector number. The value in the maximum register 40 is sent to the comparator 35.

The sector number register (SCTN REG) 41 is a register in which the microprocessor 8 sets a target sector number. The value in the sector number register 40 is loaded in the sector number counter 37 in response to *Targ Change.

The comparator 35 compares a value in the position counter 33 with a value in the target register 38. When the values agree, the comparator 35 outputs a Target Sector Consistency signal Angl=Targ.

The sector length counter 36 loads a value from the size register 39, and counts servo clock pulses *SRVCL. When inputting a low level signal L through a load terminal LOAD, the sector length counter 36 loads a value from the size register 39 (it does not count *SRVCL pulses while loading the value). When a high level signal enters the load terminal, the sector length counter 36 restarts counting the *SRVCL clock pulses.

The sector length counter 36 counts the *SRVCL clock pulses for a time interval corresponding to a designated sector length, and then outputs a Carry Out signal CO. In other words, the sector length counter 36 outputs the Carry Out signal CO at intervals of the time interval corresponding to a sector length. The Carry Out signal CO is sent to the sector pulse generator 46 through the AND circuit 49 and OR circuit 47.

In response to the Carry Out signal CO, the sector pulse generator 46 generates a sector pulse SCTPL.

The sector number counter 37 loads a value from the sector number register 41, and counts servo clock pulses *SRVCL sector by sector.

The sector number counter 37 is cleared (reset) with *Index Load sent from the index pulse generator 53, and counts one *SRVCL clock pulse in response to Sect No En sent from the AND circuit 49 (or increments the previous sector number by one).

Sec No En is a signal the AND circuit 49 outputs in response to a Carry Out signal CO sent from the sector counter 36. With the output of a sector pulse, the Sct No En signal is driven high. The number of *SRVCL clock pulses is counted up (the count value is incremented by one).

For a period after the sector number counter 37 is cleared with *Index Load until it is cleared with the next *Index Load, the sector number counter 37 increments the count value by one every time a sector pulse is output. The sector number counter 37 therefore outputs a sector number signal Sct No. representing the count value.

The comparator 35 compares a value provided by the sector number counter 37 with a value set in the maximum register 40.

The comparator 35 compares a value represented by Sec No. sent from the sector number counter 37 with a value represented by Max. Sct sent from the maximum register 40. When the values agree with each other (when the sector number becomes maximum), the comparator 35 outputs *Sct No.=Max. Sct that is a signal indicating consistency. The signal enters the AND circuit 49, whereby a Carry Out signal CO is masked so that no Carry Out signal CO is supplied from the AND circuit 49.

The Target Change signal generator 53 generates a Target Change signal *Targ Change.

The register 45 is a register in which the microprocessor 8 sets a value residing in the sector number register 37 so as to read the value.

The sector pulse generator 46 produces a sector pulse in response to the Carry Out signal CO sent from the sector length counter 36 or the Target Sector Consistency signal Angl=Targ sent from the comparator 34.

The index pulse generator 53 inputs an index signal INDEX and generates an index pulse IDXPL. When generating the index pulse IDXPL, the index pulse generator 53 outputs an Index Load signal *Index Load.

When *Targ Change is low, *Index Load is low, or an output of the OR circuit 47 is high (an output of the inverter 52 is low), the OR circuit 48 sends a low level signal L to the sector length counter 36. With the low level signal, the sector length counter 36 enters a load state.

When *Targ Change is high, the AND circuit 50 passes a sector pulse SCTPL sent from the sector pulse generator 46. When *Targ Change is low, the AND circuit 50 masks the sector pulse SCTPL so as to disable the output of the sector pulse SCTPL.

When *Targ Change is high, the AND circuit 51 passes IDXPL supplied from the index pulse generator 53. When *Targ Change is low, the AND circuit 51 masks IDXPL so as to disable the output of IDXPL.

When *Sct No.=Max. Sct supplied from the comparator 35 is high, the AND circuit 49 passes a Carry Out signal CO supplied from the sector length counter 36. When *Sct No.=Max. Sct is low, the AND circuit 49 masks the Carry Out signal CO so as to disable output of the Carry Out signal CO.

Figures 7, 8:
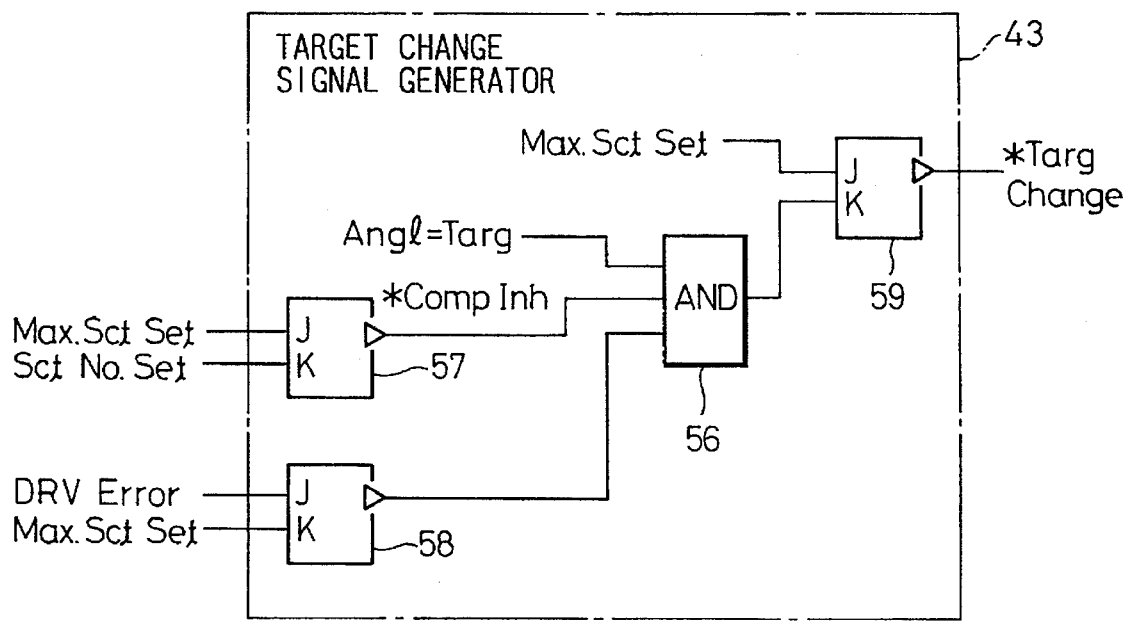
FIG. 7 is a block diagram showing a Target Change signal generator in the embodiment.
FIG. 8 is a diagram showing an example of a data table.

FIG. 7 is a block diagram showing a Target Change signal generator. The Target Change signal generator will be described in conjunction with FIG. 6.

As illustrated, the Target Change signal generator 53 is composed of JK flip-flops (JK-FF) 57, 58, and an AND circuit 56.

In FIG. 7, *Comp Inh denotes an output signal of the JK flip-flop 57. *Targ Change denotes an output signal of the JK flip-flop 59. (A signal bearing an asterisk * is low active.)

In the JK flip-flop 57, when Max. Sct get is high and Sec No. Set is low, *Comp Inh goes low. When Max. Sct Set is low and Sct No. Set is high, *Comp Inh goes high.

When DRV Error is high and Max. Sct Set is low, an output of the JK flip-flop 58 goes low. When DRV Error is low and Max. Sct Set is high, the output goes high. In the JK flip-flop 59, when Max. Sct Set is high and an output of the AND circuit is low, *Targ Change goes low. When Max. Sct get is low and the output of the AND circuit is high, *Targ Change goes high.

Actions taken by a sector pulse control circuit will be described in conjunction with FIGS. 6 and 7. The description below proceeds on the assumption that the CDR technique is adopted.

Information concerning zones in a medium is written in a control field in a medium or the PROM 9 in advance. When the power supply of the magnetic disk unit is turned on, the microprocessor 8 reads information concerning zones and writes the information in the DRAM 10. When the information is needed, the microprocessor 8 reads the DRAM 10 and outputs control signals.

FIG. 8 shows an example of a data table. The data table is produced in the DRAM 10 by the microprocessor 8. The data table contains data such as sector lengths and maximum sector numbers in association with zones in a medium.

In the example shown in FIG. 8, there are zones 0 to 11. For instance, zone 0 has a sector length S0 and a maximum sector number M0. Zone 1 has a sector length S1 and a maximum sector number M1.

In response to a Read or Write instruction sent from a host computer, the microprocessor 8 reads necessary data from the data table and sets the data in a register in the sector pulse control unit 23.

The production of the data table will be described. A magnetic disk for a magnetic disk unit has a field in which control information is written. This field contains control information such as a storage capacity of a track and the writing frequency which is specified for each zone.

When the power supply of the magnetic disk unit is turned on, the microprocessor 8 reads the control information from the medium and produces a data table in the DRAM 10.

The sector length written down in the data table is a sector length of a zone to be accessed that is calculated by converting the number of servo clock pulses. The microprocessor 8 performs this calculation and stores values in the data table.

In response to a Data Write or Read command sent from a host computer, the microprocessor 8 uses the command information to calculate a cylinder number in a disk to be accessed, a head number used for the access, and a sector number in the disk to be accessed, and outputs a Head Seek instruction to the DSP 15 via the control LSI device 13.

The microprocessor 8 then sets a maximum sector number (MAX) of a zone in which a sector to be accessed resides, a sector length (sector size) (SIZE), a target sector position (TARG), and a target sector number (SCTN) in the registers 40, 39, 38, and 41 shown in FIG. 6 in that order.

First of all, the maximum sector number of a zone is set in the maximum register 40. Next, the sector length is set in the size register 39. Thereafter, the target sector position is set in the target register 38. Finally, the target sector number is set in the sector number register 41.

The sector length (sector size) (SIZE) to be set in the size register 39 is provided as a value representing the number of servo clock pulses corresponding to a sector length in a zone to be accessed. A value is read from the data table existent in the DRAM 10 in advance, and set as the sector length.

The maximum sector number of a zone to be set in the maximum register 40 is specified with a value read from the data table existent in the DRAM 10.

The target sector position to be set in the target register 38 is specified with a value the microprocessor 8 calculates by multiplying a value set in the size register 39 by a value set in the sector number register 41.

First, the microprocessor 8 sets a value in the maximum register 40. Max. Sct Set is then driven high. The JK flip-flops 57 and 59 in the Target Change signal generator 43 are set. The output of the Target Change signal generator 43, *Targ Change, goes low.

After going low, *Targ Change is sent to the AND circuits 50 and 51. In the AND circuits 50 and 51, mask bits are set for an index pulse IDXPL provided by the index pulse generator 53 and a sector pulse SCTPL provided by the sector pulse generator 46. In this state, both IDXPL and SCTPL are not output to the HDC 12.

When *Targ Change goes low, the sector length counter 36 and sector number counter 37 are placed in load states.

The sector counter 36 then loads a new value from the size register 39 synchronously with the next servo clock pulse. The sector number counter 37 loads a new value from the sector number register 41.

When the JK flip-flop 57 outputs a low-level Comparison Inhibit signal *Comp Inh, the AND circuit 56 enters a gate turn-off state. The AND circuit 56 masks an input thereof, Angl=Targ, so as to disable output of Angl=Targ.

The AND circuit 56 masks an output of the comparator 34, Angl=Targ. When a value is set in the sector number register 41, the Sector Number Set signal Sct No. Set is driven high.

The JK flip-flop 57 in the Target Change signal generator 43 is therefore reset, causing *Comp Inh to go high. Angl= Targ is unmasked. Masking Angl=Targ is intended to prevent detection of a target sector from starting before values are set in the four registers 38 to 41.

As mentioned above, after Angl=Targ is unmasked, when a value provided by the position counter 33 becomes consistent with a value set in the target register 38, the comparator 34 outputs a Target Sector Consistency signal Angl= Targ (high level signal). With Angl=Targ, the JK flip-flop 59 is reset and *Targ Change is driven high.

Angl=Targ is sent to the sector pulse generator 46 via the OR circuit 47, so that the first sector pulse is output. One sector pulse SCTPL is generated.

The sector pulse SCTPL generated by the sector pulse generator 46 is sent to the microprocessor 8 via the AND circuit 50 (since *Targ Change is high, the AND circuit 50 is in a gate turn-on state).

When *Targ Change goes high, a signal LOAD entering the load terminal of the sector length counter 36 is driven high. The sector length counter 36 starts counting servo clock pulses *SRVCL. When counting the number of clock pulses represented by the loaded value, the sector length counter 36 outputs a Carry Out signal CO.

The Carry Out signal CO passes through the AND circuit 49, and enters the sector pulse generator 46 via the OR circuit 47. A sector pulse SCTPL is then generated.

When the Carry Out signal CO is output, it enters as a low level signal the load terminal LOAD in the sector length counter 36 via the inverter 52 and the OR circuit 48. This causes the sector length counter 36 to be re-loaded with a value from the size register 39. This procedure is repeated. The sector pulse SCTPL is generated in units of a sector length (sector size), and supplied to the HDC 12.

The Carry Out signal CO is supplied as a Sector Number Enable signal Sct No En from the AND circuit 49, and fed to the enabling terminal EN in the sector number counter 37. With the input of Sct No En, the sector number counter 37 increments the value loaded from the sector number register 41 by one.

The sector number in the sector number counter 37 is incremented by one every time the sector pulse SCTPL is generated. By reading a data output of the sector number counter 37, the microprocessor 8 is aware of a current sector number.

Counting is carried out as mentioned above. When the count of the sector number counter 37 becomes a value existent in the maximum register 40, the comparator 35 outputs a signal *Sct No=Max. Sct meaning that a value represented by Sct No. agrees with a value represented by Max. Sct.

The signal *Sct No=Max. Sct enters the AND circuit 49. The AND circuit 49 then masks a Carry Out signal CO provided by the sector length counter 36 so as to disable subsequent output of the sector pulse SCTPL.

When Sec No=Max. Sct enters the AND circuit 49, the Carry Out signal CO supplied from the sector length counter 36 does not enter the OR circuit 47 and sector pulse generator 46. The sector pulse generator 46 therefore does not output a sector pulse.

When the next index pulse INDEX arrives, the index pulse generator 53 outputs an index pulse IDXPL. The IDXPL pulse is sent to the HDC 12 via the AND circuit 51.

At the same time, an Index Load signal *Index Load supplied from the index pulse generator 53 is applied to the load terminal LOAD in the sector length counter 36 via the OR circuit 48. The *Index Load signal is also sent to the clear terminal CLR of the sector number counter 37.

The sector number counter 36 then enters a load state, re-loads a value from the size register 39, and starts counting servo clock pulses *SRVCL. The sector number counter 37 is cleared (reset), thus indicating a sector number 0. The sector number counter 37 restarts counting servo clock pulses with the next sector pulse.

After the microprocessor 8 sets a value in the sector number register 41, and until a target sector comes along, the sector number counter 37 remains loaded with a target sector number. Therefore, the microprocessor 8 cannot read a sector number.

In an effort to prevent occurrence of the above event, the Target Change signal *Targ Change is allocated to an extra bit in the register 45. When reading the register 45, the microprocessor 8 checks if the bit is set to logical 1.

When reading a sector number is inhibited, if it becomes necessary to learn a head position, the microprocessor 8 reads data from the position counter 33. When zones are changed, the foregoing sequence is followed. Even when reading or writing is not accompanied by zone changing, the foregoing sequence is followed.

Figure 9:
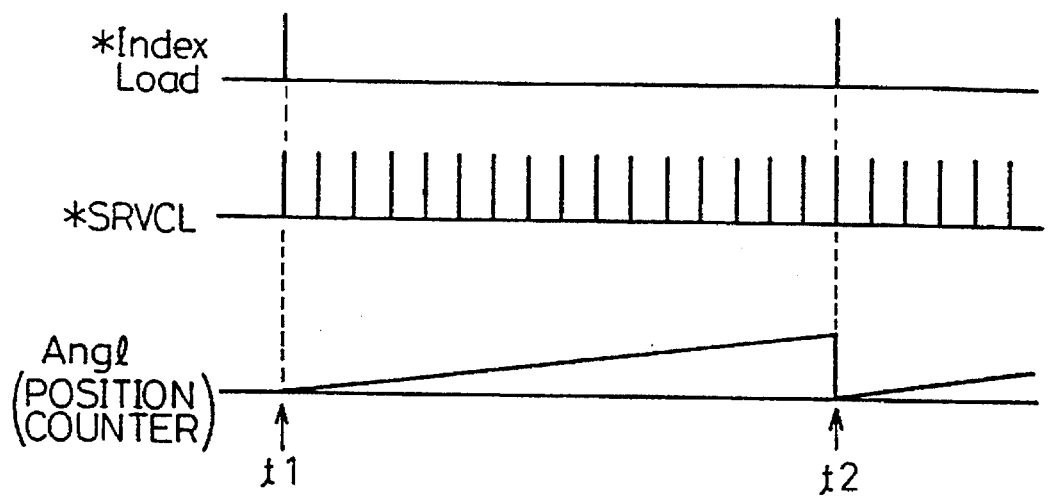
FIG. 9 is a time chart concerning a position counter in the embodiment.

FIG. 9 is a time chart 1 concerning a position counter. When an Index Load signal *Index Load enters the position counter 33 at a time instant t1, the position counter 33 is cleared (reset) to zeros. After the time instant t1, the position counter 33 keeps counting servo clock pulses *SRVCL.

When *Index Load re-enters the position counter 33 at a time instant t2, the position counter 33 is cleared to zeros. Thereafter, the position counter 33 keeps counting servo clock pulses *SRVCL. This procedure is repeated. Consequently, the position counter 33 outputs an angle signal Angl.

The angle signal Angl supplied from the position counter 33 represents a count of the *SRVCL pulses corresponding to an angle of a rotation made by a medium.

The count of the position counter 33 can be read freely by the microprocessor 8. The microprocessor 8 can learn a current position of a head by reading the value or count from the position counter 33. A target sector can therefore be identified efficiently.

Figure 10:
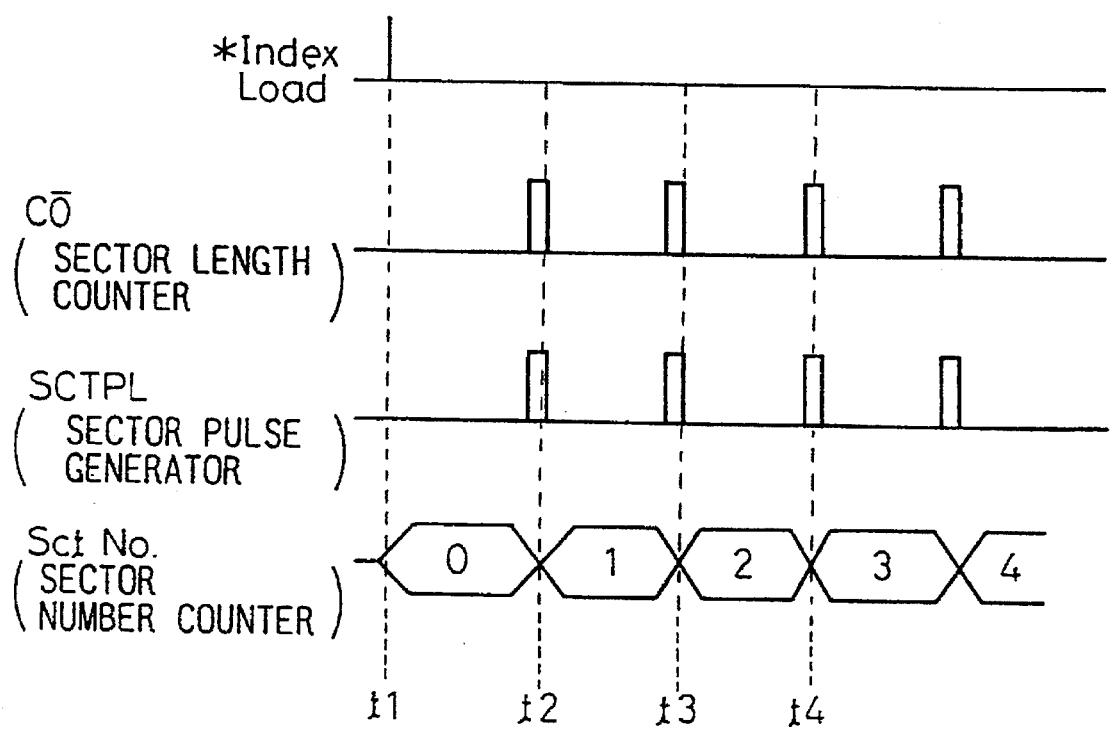
FIG. 10 is a time chart concerning a sector number counter and a sector length counter in the embodiment.

FIG. 10 is a time chart 2 concerning a sector number counter and a sector length counter. The actions taken by the sector number counter 37 and sector length counter 36 will be described in conjunction with FIG. 10.

For example, when an Index Load signal *Index Load is supplied from the index pulse generator 53 at a time instant t1, a low level signal enters the sector length counter 36 through the load terminal LOAD. The sector length counter 36 then loads a value from the size register 39.

When *Index Load disappears, a high level signal enters the sector length counter 36 through the load terminal LOAD. The sector length counter 36 starts counting servo clock pulses *SRVCL. When a designated number of the *SRVCL pulses have been counted, the sector length counter 36 outputs a Carry Out signal CO at a time instant t2.

The Carry Out signal CO passes through the AND circuit 49 and OR circuit 47, and enters the sector pulse generator 46. The sector pulse generator 46 then generates a sector pulse SCTPL. With the entry of the Carry Out signal CO, the AND circuit 49 outputs a Sector Number Enable signal Sct No En. The Sct No En signal enters the sector number counter 37 through the enabling terminal EN.

The sector number counter 37 is therefore enabled, thus incrementing a value loaded from the sector number register 41 by one. The sector number counter 37 outputs the count value as a sector number signal Sct No.

As mentioned above, the sector length counter 36 outputs a Carry Out signal CO at each of time instants t3, t4, etc. Consequently, a sector pulse SCTPL is generated according to each sector.

With generation of a sector pulse SCTPL, a Sector Number Enable signal Sct No En is generated and fed to the sector number counter 37. The sector number counter 37 increments the count thereof by one every time a sector pulse is generated, thus counting up a sector number.

FIG. 11 is a time chart 3 concerning a sector pulse control unit. The actions taken by the sector pulse control unit will be described in conjunction with the time chart of FIG. 11. In this example, a sector n is accessed in response to a command (for example, a Read command).

As mentioned above, after being cleared with *Index Load, the position counter 33 keeps counting servo clock pulses *SRVCL. The sector pulse generator 46 generates a sector pulse SCTPL every time the sector length counter 36 supplies a Carry Out signal CO.

The sector number counter 37 counts up a sector number by incrementing the count value thereof by one every time a sector pulse SCTPL is generated. The sector number counter 37 then outputs the count value as a sector number signal Sct No.

Under these circumstances, for example, the magnetic disk unit receives a Read command from a host computer at a time instant t1. In response to the command, the microprocessor 8 controls seeking of a head and sets values in the registers 38 to 41 in the sector pulse control unit 23.

First of all, the microprocessor 8 sets a maximum sector number (Max Sct) in the maximum register 40. The microprocessor 8 then sets sector length (Sct Size) in the size register 39. The microprocessor 8 then sets a target sector position (Targ Pos) in the target register 38. Finally, the microprocessor 8 sets a target sector number (Sct No) in the sector number counter 41.

The microprocessor 8 activates the format control unit 23 at a time instant t3, while specifying the values in the registers. Through the foregoing process, the maximum sector number (Max Sct) is specified in the maximum register 40. The maximum Sector Set signal Max. Sct Set provided by the Target Change signal generator 43 is then driven high, causing the Comparison Inhibit signal *Comp Inh supplied from the JK flip-flop 57 to go from high to low.

As a result, the Target Change signal *Targ Change supplied by the JK flip-flop 59 goes from high to low. In this state, *Comp Inh remains low. The Target Sector Consistency signal Angl=Targ supplied from the comparator 34 is masked by the AND circuit 56 and then reset.

After going low, the Target Change signal *Targ Change enters the AND circuits 50 and 51. Consequently, the index pulse IDXPL supplied from the index pulse generator 53 and the sector pulse SCTPL supplied from the sector pulse generator 46 are masked and reset.

Under these circumstances, a head is sought. Meanwhile, the index pulse IDXPL and sector pulse SCTPL are not fed to the HDC 12.

At a time instant t4, the microprocessor 8 sets a target sector number in the sector number counter 41. The Sector Number Set signal Sct No. Set goes high and enters the JK flip-flop 57 in the Target Change signal generator 43.

With the entry of the high level signal Sct No. Set, *Comp Inh supplied from the JK flip-flop 57 goes high. The asking of AND circuit 56 is then stopped. The comparison for outputting Angl=Targ is started.

However, Angl=Targ is not active. *Targ Change supplied from the JK flip-flop 59 therefore remains low. The index pulse IDXPL and sector pulse SCTPL are not fed to the HDC 12.

Thereafter, the comparator 34 compares a value that is specified in the target register 38 by the microprocessor 8 with a value provided by the position counter 33. When the values agree with each other, a Comparison Consistency signal Angl=Targ (high level signal) is output.

At a time instant t5 when a head reaches a target position or a sector n as a result of seeking, the comparator 34 outputs a high level signal Angl=Targ. The Angl=Targ signal enters the AND circuit 56 in the Target Change generator 43 and causes an output of the AND circuit 56 to go high.

As a result, the Target Change signal *Targ Change supplied from the JK flip-flop 59 is driven high at a time instant t6. When *Targ Change goes high, the AND circuits 50 and 51 stop masking. At this time, it becomes possible to transmit the sector pulse SCTPL and index pulse IDXPL to the HDC 12.

With the output of the Comparison Consistency signal Angl=Targ, *Targ Change is sent to the sector pulse generator 46 via the OR circuit 47. The first sector pulse SCTPL is then generated. Thereafter, a sector pulse is generated in response to a Carry Out signal CO supplied from the sector length counter 36, and sent to the HDC 12.

Thus, the sector pulse SCTPL is generated and sent to the HDC 12. The format control unit 22 in the HDC 12 then starts reading or any other operation.

In the above-mentioned embodiment, the sector pulse generator 46 stops operating from when the access operation starts until the head reaches the target sector. However, in order to realize the object of the present invention, it is only required to stop inputting thesector pulse to the format control unit 22 from when the access operation starts until the head reaches the target sector.

FIG. 12 is a block diagram showing a constitution of another embodiment to realize the object of the present invention.

In this embodiment, a sector pulse generation unit 3 always generates a sector pulse. A mask unit 5 receives a target pulse from the target sector detection unit 4, and which masks the sector pulse SCTPL so as not to input it to said format control unit 22 from when said access operation starts until said target pulse is received from said target sector detection unit 4.

An embodiment has been described so far but the present invention can also be implemented in a magnetic disk unit described below.

(1) Aside from a CDR type magnetic disk unit, the present invention can be applied to a magnetic disk unit that is of a fixed sector length type but not of the CDR type.

(2) The configuration of a magnetic disk unit is not limited to the one of the embodiments described previously. The present invention can be applied to a magnetic disk unit having a similar configuration.

As described, the present invention has the following advantages.

(1) Unlike prior arts, an interrupt having a high priority need not be performed in order to detect a sector. Reading or writing of a target sector can be started reliably. Consequently, an overhead affecting an interface in a host computer is eliminated.

If an interrupt occurrs during an operation, the operation would still be successfull. No restriction need be imposed on a processing time and a highly reliable system can be constructed.

(2) Hardware need not be modified for installing a format control unit. General LSI products for constituting a magnetic disk control circuit need not be modified but can be used as they are. Moreover, an overhead attributable to internal control of the magnetic disk unit can be minimized. Since the general LSI products can be used as they are, the cost of the disk unit need not increase.

(3) In a CDR type magnetic disk unit, even when a head moves over a zone, a sector pulse can be output to a format control unit at a target sector position without waiting for an index pulse. Unlike the prior arts, an index wait time is not required. This results in high-speed processing.

(4) Until a head reaches a target sector, an index pulse IDXPL and a sector pulse SCTPL are masked. When the head reaches the target sector, the output of sector pulses begins. With each sector pulse, the format control unit automatically starts data passing control.

(5) A sector number counter accepts a target sector number, and counts sectors succeeding the target sector. By reading a value from the sector number counter, the format control unit or microprocessor can be aware of the current sector number.

(6) The microprocessor reads a value from the position counter that counts up a bit position for a time interval corresponding to one rotation of a disk until a target sector comes along, and thus becomes aware of a current position of a head. The microprocessor can therefore specify a target sector efficiently.

What is claimed is:

1. A disk unit comprising:

a processing unit which controls access by at least a head to a target sector;

a sector pulse generation unit which generates a sector pulse according to a signal written in servo information on a medium surface;

a format control unit which controls the format of read data and write data, and which starts format control when said sector pulse is received after an activation command is received from said processing unit; and a target sector detection unit which receives information regarding the target sector from said processing unit, detects a time instant when said head reaches the target sector according to said information specified by said processing unit and information generated from said signal written in servo information on said medium surface, and outputs a target pulse at said time instant; wherein said sector pulse generation unit stops outputting said sector pulse to said format control unit from when said target sector detection unit receives information regarding the target sector from said processing unit until said target pulse is received from said target sector detection unit.

2. A disk unit according to claim 1, wherein:

a recording frequency of data is changed according to a cylinder to be used.

3. A disk unit according to claim 2, wherein: said target sector detection unit comprises:

a servo clock counting means which is reset to zero by an index signal produced in response to an index mark in said servo information surface on said medium, and which counts servo clock pulses having a constant frequency and being produced according to servo information in said medium; and a comparing means for comparing a value provided by said servo clock counting means with a number of servo clock pulses corresponding to a position of a target sector and outputting a Consistency signal when said value agrees with said number.

4. A disk unit according to claim 3, wherein said comparing means includes a target sector storing means for storing the number of servo clock pulses corresponding to said position of said target sector.

5. A disk unit according to claim 3, wherein said sector pulse generation unit comprises:

a sector length counting means that is reset to zero by the sector pulse and that counts the number of servo clock pulses corresponding to a sector length and outputs a Counting End signal.

6. A disk unit according to claim 5, wherein said sector length counting means includes a sector length storing means for storing the number of servo clock pulses corresponding to a sector length.

7. A disk unit according to claim 2, further comprising a sector pulse counting means in which a target sector number is set by said processing unit and which counts sector pulses subsequent to a sector pulse indicating a target sector.

8. A disk unit according to claim 7, wherein said sector pulse counting means includes a target sector number storing means for storing said target sector number.

9. A disk unit according to claim 7, further comprising:

a maximum sector comparing means for comparing a count value in said sector pulse counting means with a maximum sector number; and a masking means for masking a sector pulse when said maximum sector number is exceeded.

10. A disk unit according to claim 9, wherein said maximum sector comparing means includes a maximum sector number storing means for storing a maximum sector number.

11. A disk unit according to claim 2, further comprising a masking means that, when a target sector is to be accessed and a drive control unit detects a drive error signal before said target sector comes along, masks a sector pulse in response to said drive error signal.

12. A disk unit according to claim 2, wherein said sector pulse generation unit includes a sector pulse mask unit which masks said sector pulse so as not to input the pulses to said format control unit from when said access operation starts until said target pulse is received from said target sector detection unit.

13. A disk unit according to claim 1, wherein: said target sector detection unit comprises:

a servo clock counting means which is reset to zero by an index signal produced in response to an index mark in said servo information surface on said medium, and which counts servo clock pulses having a constant frequency and being produced according to servo information in said medium; and a comparing means for comparing a value provided by said servo clock counting means with a number of servo clock pulses corresponding to a position of a target sector and outputting a Consistency signal when said value agrees with said number.

14. A disk unit according to claim 13, wherein said comparing means includes a target sector storing means for storing the number of servo clock pulses corresponding to said position of said target sector.

15. A disk unit according to claim 13, wherein said sector pulse generation unit comprises:

a sector length counting means that is reset to zero by the sector pulse and that counts the number of servo clock pulses corresponding to a sector length and outputs a Counting End signal.

16. A disk unit according to claim 15, wherein said sector length counting means includes a sector length storing means for storing the number of servo clock pulses corresponding to a sector length.

17. A disk unit according to claim 1, further comprising a sector pulse counting means in which a target sector number is set by said processing unit and which counts sector pulses subsequent to a sector pulse indicating a target sector.

18. A disk unit according to claim 17, wherein said sector pulse counting means includes a target sector number storing means for storing said target sector number.

19. A disk unit according to claim 17, further comprising:

a maximum sector comparing means for comparing a count value of said sector pulse counting means with a maximum sector number; and a masking means for masking a sector pulse when said maximum sector number is exceeded.

20. A disk unit according to claim 19, wherein said maximum sector comparing means includes a maximum sector number storing means for storing a maximum sector number.

21. A disk unit according to claim 1, wherein said sector pulse generation unit includes a sector pulse mask unit which masks said sector pulses so as not to input the pulses to said format control unit from when said access operation starts until said target pulse is received from said target sector detection unit.

22. A disk unit according to claim 1, further comprising a masking means that, when a target sector is to be accessed and a drive control unit detects a drive error signal before said target sector arrives, masks a sector pulse in response to said drive error signal.

23. A sector control method for a disk unit including a processing unit which controls access of a magnetic head to a target sector, a sector pulse generation unit which generates a sector pulse according to a signal written on a servo information surface of a medium, and a format control unit which controls formatting of read and write data using the sector pulse and starts said formatting control when the sector pulse is received after an activation command is received from the processing unit, said method comprising the steps of:

stopping output of the sector pulse to the format control unit during a seek to the target sector until the target sector is reached;

outputting the activation command from the processing unit;

detecting, using information regarding the target sector and servo information read from the medium, a time that the magnetic head reaches a sector immediately preceding the target sector;

generating a target pulse when said time is detected; and restarting output of the sector pulse when the target pulse is generated after the activation command is received.

24. A sector control method for a disk unit according to claim 23 wherein:

a recording frequency for the data is changed according to a cylinder to be used.

25. A disk unit comprising:

a processing unit which controls access by at least a head to a target sector;

a sector pulse generation unit which generates a sector pulse according to a signal written in servo information on a medium surface;

a format control unit which controls the format of read data and write data, and which starts format control when said sector pulse is received from said processing unit;

a target sector detection unit which receives information regarding the target sector from said processing unit, detects a time instant when said head reaches the target sector according to said information specified by said processing unit and information generated from said signal written in servo information on medium surface, and outputs a target pulse at said time instant; and a sector pulse stop unit which stops an output of said sector pulse to be input to said format control unit from when said target sector detection unit receives information regarding the target sector from said processing unit until said target pulse is received from said target sector detection unit.

* * * * *

UNITED STATES PATENT AND TRADEMARK OFFICE
CERTIFICATE OF CORRECTION

PATENT NO. : 5,650,882
DATED : July 22, 1997
INVENTOR(S) : Tsurumi et al.

It is certified that error appears in the above-indentified patent and that said Letters Patent is hereby corrected as shown below:

On the Title Page:

Under "[57] Abstract", line 10, delete "after a activating" and insert --after an activating-- therefor.

Column 1, line 23, delete "is reduced" and insert --be reduced-- therefor.

Column 1, line 25, delete "has become" and insert --have become-- therefor.

UNITED STATES PATENT AND TRADEMARK OFFICE
CERTIFICATE OF CORRECTION

PATENT NO. : 5,650,882
DATED : July 22, 1997
INVENTOR(S) : Tsurumi et al.

It is certified that error appears in the above-indentified patent and that said Letters Patent is hereby corrected as shown below:

Column 2, line 5, delete "ecessive" and insert --excessive-- therefor.

Column 2, line 29, delete "Consequently, Another" and insert --Consequently, another-- therefor.

Column 2, line 39, delete "therefore been" and insert --has therefore been-- therefor.

Column 2, line 40, delete "on efficient" and insert --an efficient-- therefor.

Column 2, line 57, delete "merely be set" and insert --merely set-- therefor.

UNITED STATES PATENT AND TRADEMARK OFFICE
CERTIFICATE OF CORRECTION

PATENT NO. : 5,650,882
DATED : July 22, 1997
INVENTOR(S) : Tsurumi et al.

It is certified that error appears in the above-indentified patent and that said Letters Patent is hereby corrected as shown below:

Column 3, line 51, delete "outputtig sector" and insert --outputting sector-- therefor.

Column 5, line 17, delete "by varing the" and insert --by varying the-- therefor.

Column 5, line 34, delete "disk increase." and insert --disk increases.-- therefor.

Column 5, line 49, delete "disks rotates" and insert --disk rotates-- therefor.

Column 6, line 43, delete "instant T1." and insert --instant t1.-- therefor.

UNITED STATES PATENT AND TRADEMARK OFFICE
CERTIFICATE OF CORRECTION

PATENT NO. : 5,650,882
DATED : July 22, 1997
INVENTOR(S) : Tsurumi et al.

It is certified that error appears in the above-indentified patent and that said Letters Patent is hereby corrected as shown below:

Column 6, line 40, delete "Assuming" and insert --Assume-- therefor.

Column 6, line 61, delete "Using of" and insert --Use of-- therefor.

Column 7, line 15, delete "after a activating" and insert --after an activating-- therefor.

Column 8, line 2, delete "SCT No; means" and insert --Sct No. means-- therefor.

Column 8, line 43, delete "control various" and insert --controls various-- therefor.

UNITED STATES PATENT AND TRADEMARK OFFICE
CERTIFICATE OF CORRECTION

PATENT NO. : 5,650,882
DATED : July 22, 1997
INVENTOR(S) : Tsurumi et al.

It is certified that error appears in the above-indentified patent and that said Letters Patent is hereby corrected as shown below:

Column 8, line 49, delete "hass access." and insert --has access.-- therefor.

Column 9, line 64, delete "in writting data" and insert --in writing data-- therefor.

Column 11, line 25, delete "Sect No." and insert --Sct No.-- therefor.

Column 13, line 46, delete "Max. Sct get" and insert --Max. Sct Set-- therefor.

Column 13, lines 55-56, delete "Max. Sct get" and insert --Max. Sct Set-- therefor.

UNITED STATES PATENT AND TRADEMARK OFFICE
CERTIFICATE OF CORRECTION

PATENT NO. : 5,650,882
DATED : July 22, 1997
INVENTOR(S) : Tsurumi et al.

It is certified that error appears in the above-indentified patent and that said Letters Patent is hereby corrected as shown below:

Column 16, line 3, delete "Sec No=Max. Sct" and insert --

Sct No=Max. Sct-- therefor.

Column 18, line 12, delete "The, asking" and insert --The masking-- therefor.

Column 18, line 49, delete "thesector" and insert --the sector-- therefor.

Column 19, line 12, delete "occurrs" and insert --occurs-- therefor.

UNITED STATES PATENT AND TRADEMARK OFFICE
CERTIFICATE OF CORRECTION

PATENT NO. : 5,650,882
DATED : July 22, 1997
INVENTOR(S) : Tsurumi et al.

It is certified that error appears in the above-indentified patent and that said Letters Patent is hereby corrected as shown below:

Column 19, line 13, delete "successfull" and insert --successful-- therefor.

Signed and Sealed this

Fourteenth Day of July, 1998

Attest:

BRUCE LEHMAN

*Attesting Officer*        *Commissioner of Patents and Trademarks*